(12) United States Patent
Hung

(10) Patent No.: US 9,678,251 B2
(45) Date of Patent: Jun. 13, 2017

(54) OPTICAL HEAD FOR RECEIVING LIGHT AND OPTICAL SYSTEM USING THE SAME

(71) Applicant: OtO Photonics Inc., Hsinchu (TW)

(72) Inventor: Chien-Hsiang Hung, Hsinchu (TW)

(73) Assignee: OTO PHOTONICS INC., Hsinchu (TW)

( * ) Notice: Subject to any disclaimer, the term of this patent is extended or adjusted under 35 U.S.C. 154(b) by 152 days.

(21) Appl. No.: 14/052,204

(22) Filed: Oct. 11, 2013

(65) Prior Publication Data
US 2014/0110569 A1    Apr. 24, 2014

(30) Foreign Application Priority Data
Oct. 16, 2012 (TW) .............................. 101138142 A

(51) Int. Cl.
| | |
|---|---|
| G02B 5/02 | (2006.01) |
| G02B 19/00 | (2006.01) |
| G01J 1/04 | (2006.01) |
| G01J 1/02 | (2006.01) |
| G01J 1/42 | (2006.01) |
| G01J 3/02 | (2006.01) |
| G01J 3/18 | (2006.01) |

(52) U.S. Cl.
CPC .......... *G02B 5/0273* (2013.01); *G01J 1/0295* (2013.01); *G01J 1/044* (2013.01); *G01J 1/0414* (2013.01); *G01J 1/0422* (2013.01); *G01J 1/0425* (2013.01); *G01J 1/0474* (2013.01); *G01J 1/42* (2013.01); *G01J 3/021* (2013.01); *G01J 3/0205* (2013.01); *G01J 3/0216* (2013.01); *G01J 3/0218* (2013.01); *G01J 3/0232* (2013.01); *G01J 3/0297* (2013.01); *G01J 3/18* (2013.01); *G02B 19/0076* (2013.01)

(58) Field of Classification Search
CPC . G02B 19/0076; G02B 5/0273; G01J 1/0295; G01J 1/0414; G01J 1/0422; G01J 1/0425; G01J 1/044; G01J 1/0474; G01J 1/42; G01J 3/0205; G01J 3/021; G01J 3/0216; G01J 3/0218; G01J 3/0232; G01J 3/0297; G01J 3/18
See application file for complete search history.

(56) References Cited

U.S. PATENT DOCUMENTS 5,173,607 A * 12/1992 Yrjonen .................... G01T 7/00
                                                    250/328
2007/0292141 A1* 12/2007 Kim et al. .................... 398/182

\* cited by examiner

*Primary Examiner* — Francis M Legasse, Jr.
(74) *Attorney, Agent, or Firm* — Chieh-Mei Wang

(57) ABSTRACT

An optical head for receiving incident light is provided. The optical head comprises a transmissive cosine corrector and a reflector disposed to face the transmissive cosine corrector. The transmissive cosine corrector is disposed in an optical path of the incident light and shields the reflector from the incident light. The transmissive cosine corrector converts the incident light to scattered light having a Lambertian pattern. The reflector has an optical output section that transmits the scattered light and a reflective section that reflects the scattered light to the transmissive cosine corrector and/or the other portions of the reflective sections. An optical system using the optical head is also provided.

21 Claims, 11 Drawing Sheets

OPTICAL HEAD FOR RECEIVING LIGHT AND OPTICAL SYSTEM USING THE SAME

CROSS-REFERENCE TO RELATED PATENT APPLICATIONS

This application claims the priority benefit of Taiwan Patent Application No. 101138142, filed on Oct. 16, 2012, which is incorporated by reference in its entirety.

TECHNICAL FIELD

The present invention relates to an optical component and, more particularly, relates to an optical head for receiving incident light.

BACKGROUND

Optical systems, such as spectrometers and lux meters, have been widely used in numerous industries, including: biotechnology, environmental technology, electronics, food and beverage, industrial chemicals, materials, and pharmaceuticals. With the development of optoelectronics, the trend is to miniaturize the sizes of optical systems. Conventional optical systems that are commonly used in a laboratory setting tend to be easily damaged and need frequent calibration. The miniaturization of optical systems, on the other hand, enables the utilization of optical systems outside of the laboratory as portable test instruments. These miniaturized optical systems are suitable for a variety of innovative applications, including testing of blood, urine, pesticide residues, water quality, UV intensity, fruit sweetness, air quality, color difference between materials, and quality of optoelectronic products, as well as counterfeit alcohol, counterfeit money, counterfeit drugs, and jewelry detection, etc. These applications cover almost all areas of life and industrial fields, including home, outdoors, field surveys, onsite inspection, and material inspection in production lines.

An optical system typically includes an optical head for collecting scattered light and a light detector for measuring the intensity of the scattered light that are collected by the optical head. In lux meters, a photo sensor is adapted as the light detector. In spectrometers, the light detector includes a grating that separates complex light components into a diffracted light and a photo sensor that converts the disperse light to an electrical signal for further analysis. Given that the amount of light collected by the optical head may affect the sensitivity of the optical system, a more efficient optical head is needed. Currently, in most of the optical heads, cosine correctors are used. However, although substantially the same transmittance for light rays incident on the optical head at different angles may be achieved, the cosine corrector is not effective in increasing the amount of incident light that can be transmitted to the light detector.

SUMMARY

In one embodiment, an optical head for receiving an incident light is provided. The optical head may include a transmissive cosine corrector and a reflector. The transmissive cosine corrector may be disposed in an optical path of the incident light and converts the incident light to a scattered light in a Lambertian pattern. Light rays of the incident light incident on the transmissive cosine corrector at different angles may have substantially the same transmittance. The reflector may include at least one optical output section and a reflective section. The reflector may be positioned to face the transmissive cosine corrector such that the transmissive cosine corrector shields the reflector from the incident light. Part of the scattered light from the transmissive cosine corrector may enter the optical output section. Another part of the scattered light not entering the optical output section may be incident on the reflective section and reflected back to the transmissive cosine corrector and/or to other portions of the reflective section.

In this embodiment, the at least one optical output section may be a plurality of optical output sections symmetrically arranged with respect to a central axis of the reflector. Areas of the optical output sections may be substantially the same. In addition, the reflector may be a convex mirror, a plane mirror having retroreflective structures, a concave mirror having retroreflective structures, a plane mirror having diffusion structures, or a concave mirror having diffusion structures. Furthermore, the transmissive cosine corrector may include a plurality of reflective members connected to the transmissive cosine corrector. The reflective members may be set to face the reflector and be substantially coplanar with the transmissive cosine corrector so as to reflect the scattered light from the reflector to the optical output section and/or reflective section.

In another embodiment, an optical head for receiving an incident light is provided. The optical head may include a reflective cosine corrector, a reflector, and a light collector. The reflective cosine corrector may include an optical output section and a reflective scattering section. The reflective cosine corrector may be disposed in an optical path of the incident light. The reflector may be positioned to face the reflective cosine corrector. The light collector may be disposed at the optical output section to collect the scattered light from the reflective cosine corrector. A light collection range of the light collector may fall within a portion of the reflector so as to receive part of the scattered light that is reflected to the optical output section by the reflective cosine corrector. In other words, the light collection range of the light collector may fall within the reflective cosine corrector through the reflection of the reflector. The incident light may be converted to a scattered light in a Lambertian pattern after incident on the reflective scattering section such that light rays incident on the reflective cosine corrector at different angles may have substantially the same reflectance. The scattered light may be incident on the reflector, and/or other portions of the reflective scattering section.

In this embodiment, the reflective cosine corrector may have a flat or concave surface. The reflector may be a convex mirror, a plane mirror, a concave mirror, a plane mirror having diffusion structures, or a concave mirror having diffusion structures. Moreover, the optical may include a tubular reflective wall surrounding the reflective cosine corrector and the reflector to form an optical channel, through which the incident light is incident on the reflective cosine corrector so as to improve the ratio of the incident light incident on the reflective cosine corrector.

The optical head in the above embodiments may further include a shutter device that controls the passage of the scattered light through the optical output section. The shutter device may include a shutter unit and an actuator unit. The shutter unit may be disposed at the optical output section and is controlled by the actuator unit such that the passage of the scattered light may be regulated.

In another embodiment, an optical system including an optical head and at least one light detector is provided. The optical head may include a transmissive cosine corrector and a reflector. The transmissive cosine corrector may be disposed in an optical path of the incident light to convert the incident light to scattered light. The reflector may include at least one optical output section and a reflective section, and may be positioned to face the transmissive cosine corrector. The transmissive cosine corrector may shield the reflector from the incident light. The scattered light may be transmitted to the light detector via the optical output section and converted to an electrical signal by the light detector.

In one embodiment, the at least one optical output section may be a plurality of optical output sections symmetrically arranged with respect to a central axis of the reflector. Areas of the optical output sections may be substantially the same. In addition, the at least one light detectors may be a plurality of light detectors, and each of the optical output sections may be connected to a respective one of the light detectors directly or through a waveguide.

In yet another embodiment, an optical system including an optical head and a light detector is provided. The optical head may include a reflective cosine corrector, a reflector, and a light collector. The reflective cosine collector may include an optical output section disposed in an optical path of incident light and a reflective scattering section. The reflective cosine corrector may be positioned to face the reflector to convert the incident light to scattered light. The scattered light may be transmitted to the light detector via the optical output section and may be converted to an electrical signal by the light detector.

In one embodiment, the light detector of the optical system may include a photo sensor to convert the scattered light from the optical head to an electrical signal. In another embodiment, the light detector may include a diffractive component and a photo sensor. The scattered light from the optical head may be diffracted into a diffracted light by the diffractive component. The photo sensor may receive the diffracted light and convert it to an electrical signal for subsequent analysis. Moreover, the optical head in the foregoing optical systems may possess all the characteristics of the optical head described above.

In the optical head described above, the scattered light from the cosine corrector may be reflected by the reflector or the reflective section. The scattered light not yet entering the optical output section may be recycled by the reflector and may enter the optical output section, thus enhancing the ratio of the scattered light entering the optical output section. As a result, the amount of incident light collected by the optical head may be increased. In addition, using the cosine corrector would allow the reflectance or the transmittance of the incident light rays entering the optical head not subject to the influence of incident angles, thus more uniformed scattered light and more accurate measurement results may be obtained. Furthermore, the cosine corrector possesses Lambertian scattering characteristics, thus the incident light and the scattered light from the reflector may be scattered uniformly by the cosine corrector to further enhance the accuracy of the measurement.

DETAILED DESCRIPTION OF PREFERRED EMBODIMENTS

Figure 1:
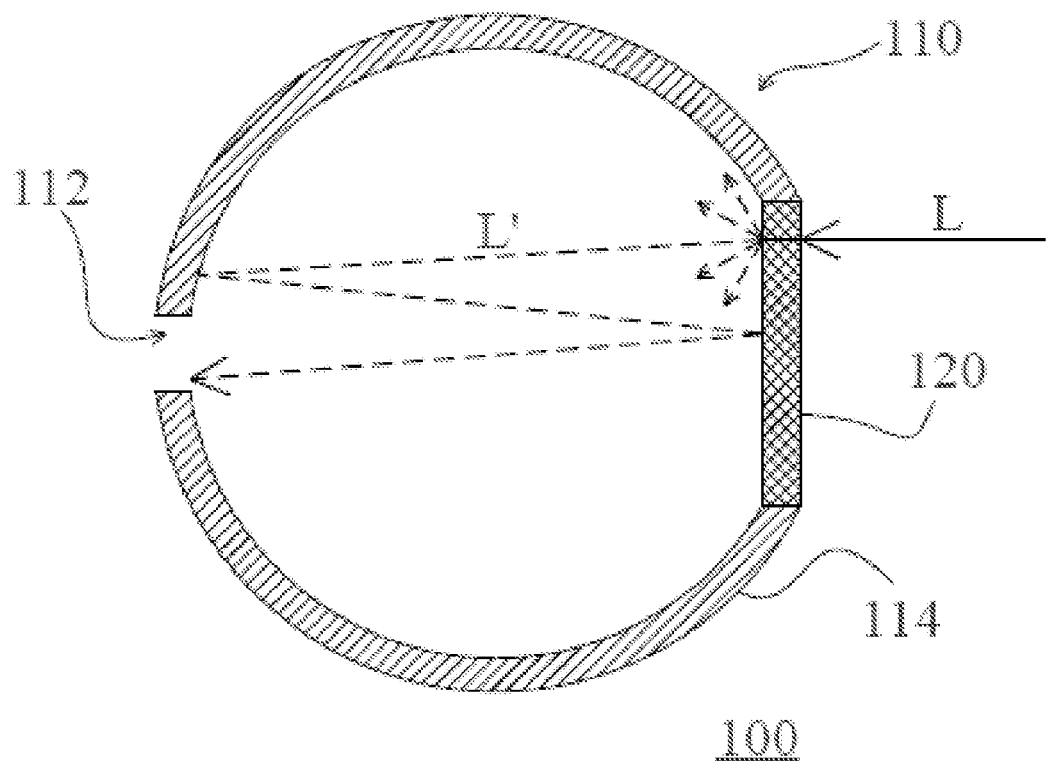
FIG. 1 is a side view of an optical head in accordance with one embodiment of the present invention.

FIG. 1 is a side view of an optical head in accordance with one embodiment of the present invention. Referring to FIG. 1, the optical head 100 for receiving incident light L includes a reflector 110 and a transmissive cosine corrector 120 facing the reflector 110. The reflector 110 includes an optical output section 112 for transmitting light and a reflective section 114. Thus, scattered light L' in a Lambertian pattern, which is converted from the incident light L after the incident light L is incident on the transmissive cosine corrector 120, may be measured. When light is incident on the transmissive cosine corrector 120, the scattered light in a Lambertian pattern will be generated on both sides of the transmissive cosine corrector 120. The intensity of the scattered light will not be affected by incident angles of the incident light. More specifically, light rays incident on the transmissive cosine corrector 120 at different angles have substantially the same transmittance and Lambertian scattering characteristics. In addition, light rays incident on the transmissive cosine corrector 120 at different angles also have substantially the same reflectance and Lambertian scattering characteristics.

For example, the transmissive cosine corrector 120 lets the incident light L incident on the transmissive cosine corrector 120 at different angles to have the same transmittance and Lambertian scattering characteristics. In addition, since the transmissive cosine corrector 120 shields the reflector 110, the incident light L will not directly strike the reflector 110; rather, only the scattered light L' may be incident on the reflector 110.

Accordingly, when the scattered light L' from the transmissive cosine corrector 120 is incident on the reflector 110, part of the scattered light L' enters the optical output section 112 of the reflector 110. Part of the scattered light L' not entering the optical output section 112 is incident on the reflective section 114 and reflected back to the transmissive cosine corrector 120, at which a second Lambertian reflectance will occur on the part of the scattered light L' that has been reflected back to the transmissive cosine corrector 120 to reflect that part of the scattered light back to the reflector 110. The above process is repeated until the part of the scattered light L' that has not yet entered the optical output section 112 either enters the optical output section 112 or attenuates and disappears eventually. The part of the scattered light L' that has not yet entered the optical output section 112 may also be reflected by the reflective section 114 to other portions of the reflective section 114 and then be reflected back to the transmissive cosine corrector 120, or reflected back and forth within the reflective section 114 until it disappears due to attenuation. Accordingly, the scattered light L' from the transmissive cosine corrector 120 may enter the optical output section 112 or be reflected by the reflective section 114 of the reflector 110. The part of the scattered light L' that has been reflected by the reflective section 114 of the reflector 110 may enter the optical output section 112 or the transmissive cosine corrector 120, or be reflected by other portions of the reflective section 114.

The use of reflector 110 to reflect the part of the scattered light that has transmitted through the transmissive cosine corrector 120 but not yet entered the optical output section 112 allows recycling of that part of the scattered light L', thus significantly increasing the ratio of the scattered light L' that enters the optical output section 112. As a result, the amount of the scattered light collected by the optical head 100 can be greatly enhanced. In addition, the use of transmissive cosine corrector 120 to receive light makes the transmittance and the Lambertian scattering characteristic of the incident light L not subject to influence of incident angles. On the other hand, the use of transmissive cosine corrector 120 to receive light also makes the reflectance and the Lambertian scattering characteristic of the scattered light L' from the reflector 110 not subject to the influence of the incident angles. Thus, in the optical head 100, the amount of the light entering the optical output section 112 will not vary and be affected by the incident angles of the incident light L.

Figure 2A:
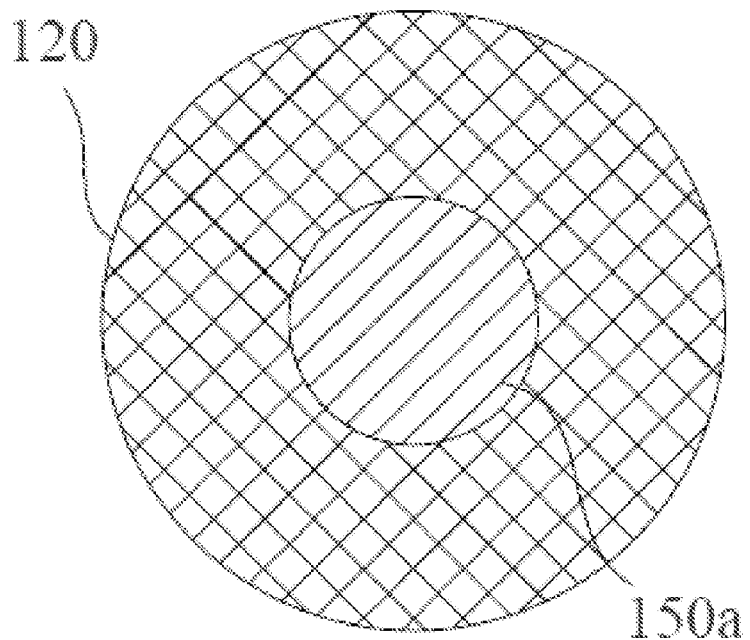
FIGS. 2A-2D are front views of at least one reflective member disposed on a transmissive cosine corrector of the optical head of FIG. 1.
Figure 2B:
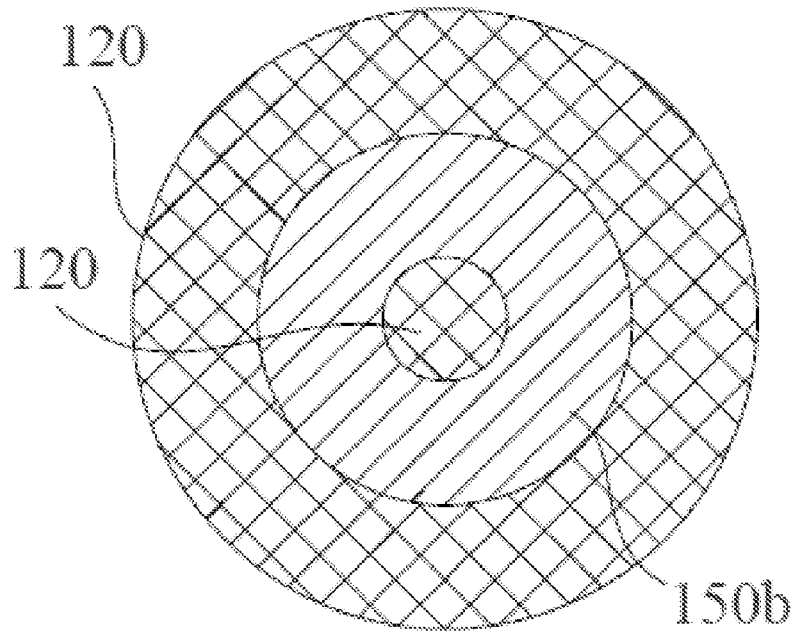
Figure 2C:
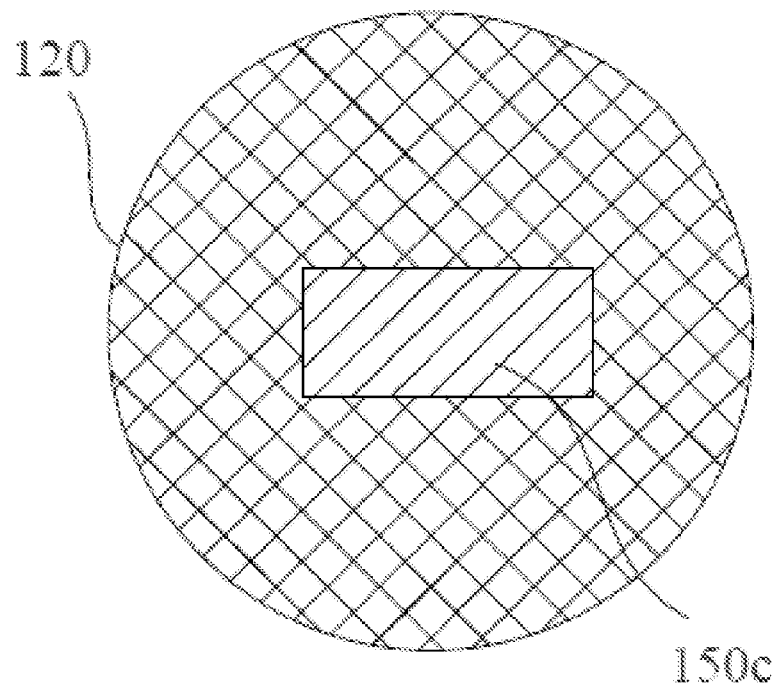
Figure 2D:
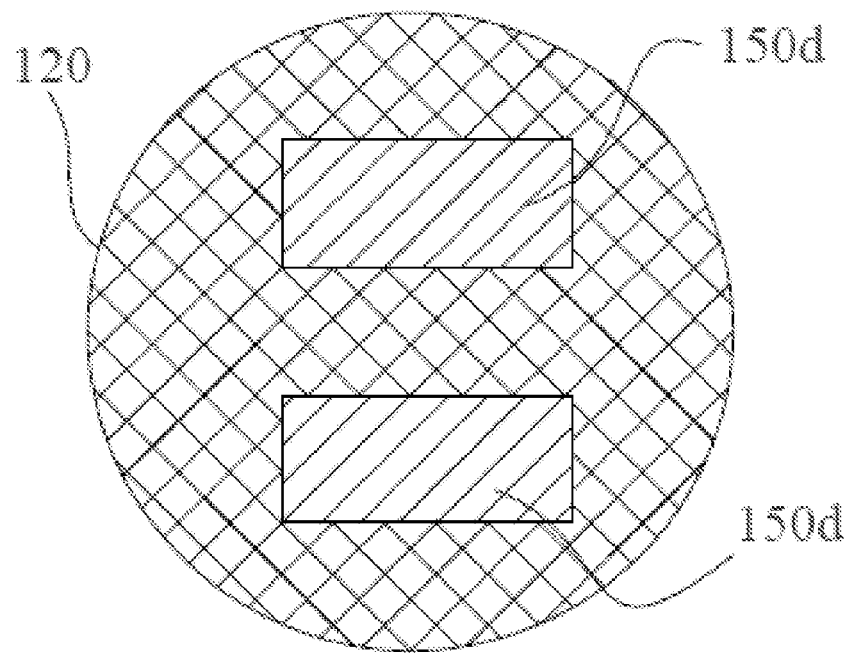

In other embodiments, the transmissive cosine corrector 120 may include at least one reflective member. FIGS. 2A-2D are front views of a transmissive cosine corrector with at least one reflective member in accordance with embodiments of the present invention. Referring to FIGS. 2A-2D, in FIGS. 2A and 2B, a circular-shaped reflective member 150a and an annular-shaped reflective member 150b are each connected to the transmissive cosine corrector 120. In FIG. 2C, a rectangular-shaped reflective member 150c is connected to the transmissive cosine corrector 120. In FIG. 2D, two rectangular-shaped reflective members 150d are connected to the transmissive cosine corrector 120. These reflective members are set to face the reflector 110 and be substantially coplanar with the transmissive cosine corrector 120. After being reflected by the reflector 110, the scattered light L' may be reflected back to the reflector 110 by the reflective members 150a-150b. Thus, placing the reflective members 150a-150d at suitable positions may increase the amount of the scattered light L' that enters the optical output section 112. Incorporating the reflective member as shown in FIG. 2A may also reduce the amount of material used to make the transmissive cosine corrector 120. The reflective member may be a reflective film or a reflective panel made of reflective materials. The reflective member may adhere to the transmissive cosine corrector 120 by adhesive or fasteners, or directly formed by coating a layer of reflective material on the transmissive cosine corrector 120.

The configurations of the reflective members 150a-150d described above are provided for illustrative purposes only, and any other configurations with different shapes, numbers, and locations, e.g., three triangular-shaped reflective members surrounding a central region, may be used. Those skilled in the art may utilize variations thereof according to actual needs in implementation.

In FIG. 1, a concave mirror is used as the reflector 110. However, according to the need, a flat or concave surface having retroreflective structures, or a flat or concave surface having diffusion structures may also be used as the reflector 110. The reflector having retroreflective structures would allow the scattered light incident on periphery of the reflector to be reflected to the transmissive cosine corrector. This would increase the chance of the scattered light entering the optical output section located at the center of the reflector after being reflected again by the transmissive cosine corrector. Similar results may be achieved by using reflector having diffusion structures.

Moreover, in FIG. 1, the optical output section 112 is located substantially at the center of the reflector 110 and is surrounded by the reflective section 114. However, the optical output section 112 may be located at other portions of the reflector 110. For example, the optical output section 112 may be located at the periphery of reflector 110 as long as part of the scattering light L' from the transmissive cosine corrector 120 may enter the optical output section 112. Those skilled in the art may determine the location of the optical output section according to their specific needs.

Figure 3A:
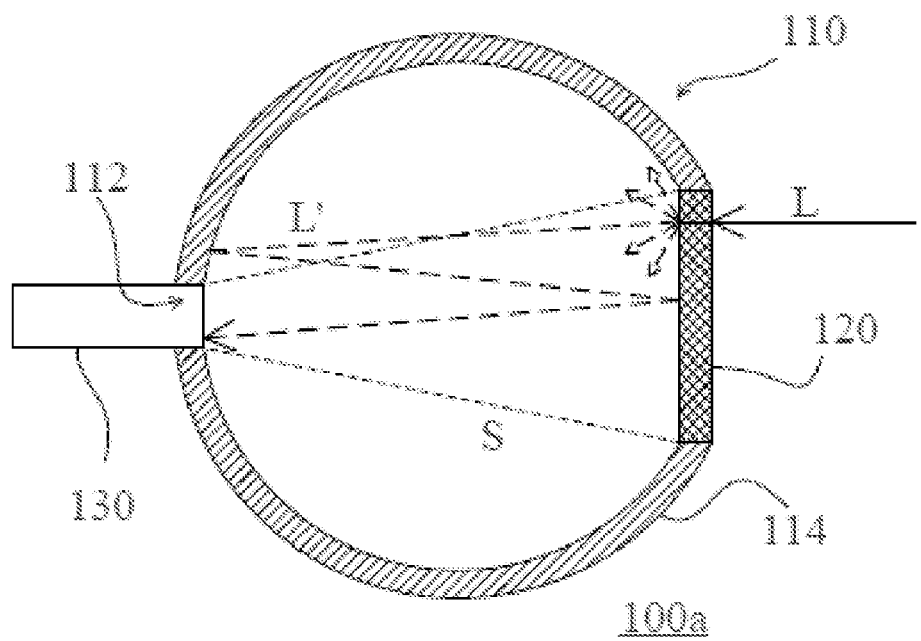
FIGS. 3A-3C are side views of the optical head of FIG. 1 with a waveguide.
Figure 3B:
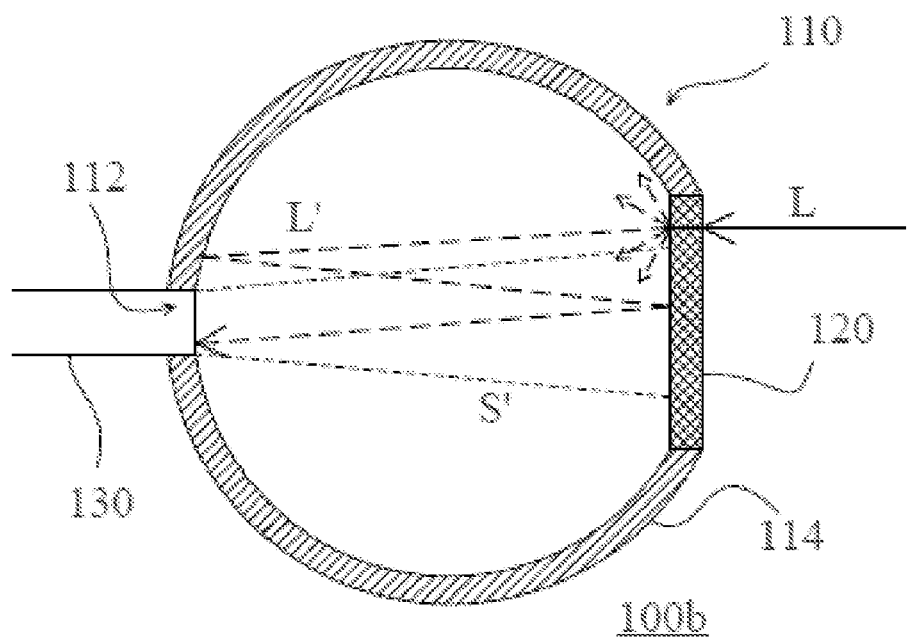
Figure 3C:
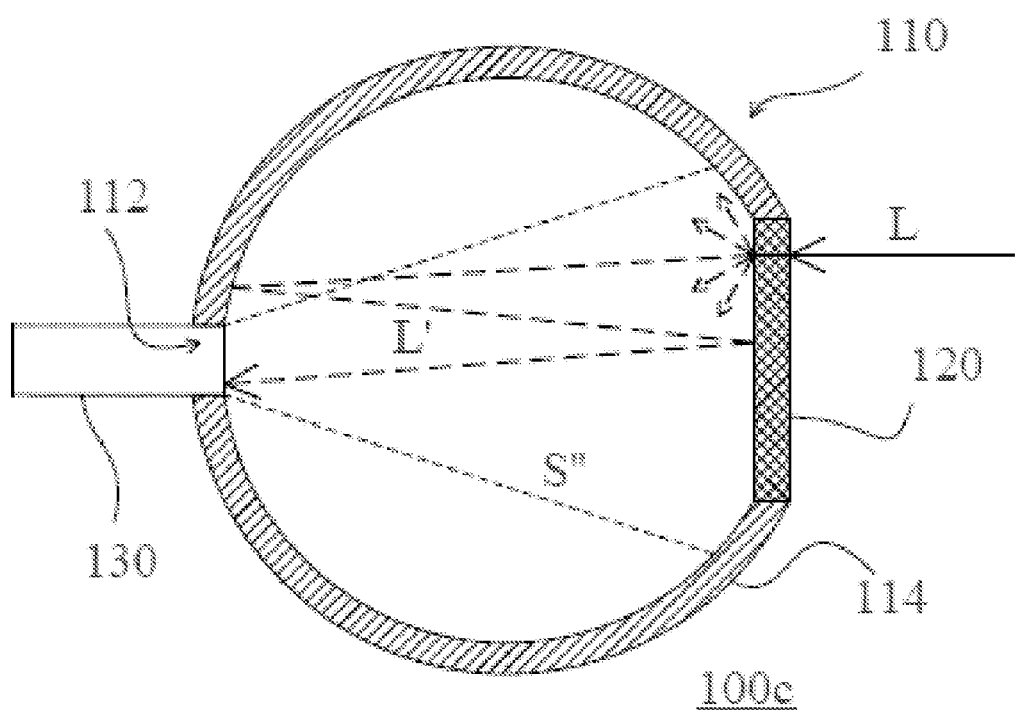

Furthermore, the optical head of the present embodiment may include a waveguide. FIG. 3A is a side view of an optical head in accordance with one embodiment of the present invention. Referring to FIG. 3A, the optical output section 112 of the optical head 100a is equipped with a waveguide 130 extending through the reflector 110. Light collection range of the waveguide 130 may overly the entire area of the transmissive cosine corrector 120, indicated as S in FIG. 3A. The light collection ranges of waveguides in accordance with other embodiments are shown in FIGS. 3B and 3C, respectively. The light collection range of the optical output section 112 may cover just a part of the transmissive cosine corrector 120, indicated as S' in FIG. 3B, or may be larger than the entire area of the transmissive cosine corrector 120, indicated as S" in FIG. 3C.

In one embodiment, the reflector may contain numerous optical output sections disposed with respect to a central axis of the reflector. These optical output sections may have substantially the same area such that about the same amount of light may enter each of the optical output sections. In other embodiments, areas and locations of the optical output sections may be varied such that light may enter a respective one of the optical output sections in a proportional amount.

Figure 4:
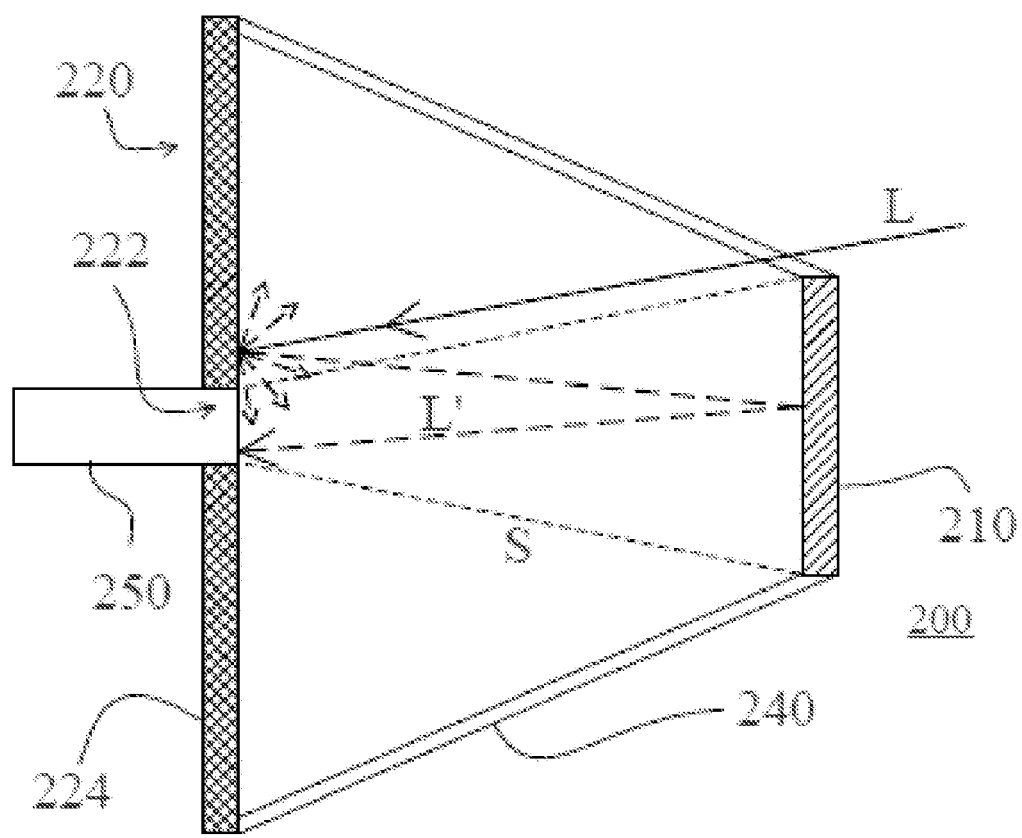
FIG. 4 is a side view of an optical head in according with another embodiment of the present invention.

FIG. 4 is a side view of an optical head in accordance with another embodiment of the present invention. Referring to FIG. 4, the optical head 200 for measuring the incident light L includes a reflector 210, a reflective cosine corrector 220, and a light collector 250. The reflector 210 is set to face the reflective cosine corrector 220 and is connected to the reflective cosine corrector 220 by connecting arms 240. In FIG. 4, two connecting arms 240 are used to connect the reflector 210 and the reflective cosine corrector 220 at the periphery. However, as known to those skilled in the art, the connecting arms 240 may be of different quantities and be disposed at different locations as long as the reflector 210 may be secured to the reflective cosine corrector 220 and light from the reflector 210 may enter the optical output section 222. For example, one or three connecting arms may be used. The connecting arms 240 may be made of a light-transmissive material and be disposed on the reflective cosine corrector 220 at a position closer to the optical output section 222. Those skilled in the art may use other types of connecting means, e.g., tubular connecting arms made of a mesh transparent material may be employed to connect the reflector 210 to the reflective cosine corrector 220. The reflective cosine corrector 220 includes an optical output section 222 and a reflective scattering section 224. After the incident light L is incident on the reflective scattering section 224 of the reflective cosine corrector 220, the incident light L is converted to scattered light L' in a Lambertian pattern, which is in turn reflected to the reflector 210. Part of the scattered light L' is reflected back to the reflective cosine corrector 220 by the reflector 210, and enters the optical output section 222. The light collector 250 is disposed at the optical output section 222 to collect the scattered light L' entering the optical output section 222. The light collection range S of the light collector 250 falls within a part of the reflector 210 that reflects the scattered L' from the reflective cosine corrector 220 to the optical output section 222. More specifically, the reflector 210 reflects not only the scattered light L' from the reflective cosine corrector 220, but also the light that has not yet been reflected by the reflective cosine corrector 220. While the light collection range S of the light collector 250 is defined such that the light collector 250 only collects the scatted light L' reflected by the reflective cosine corrector 220. Such design would only allow the scatted light L' that has been reflected by the reflector 210 to enter the light collector 250. In the present embodiment, the entire reflector 210 is used to reflect the scattered light L' from the reflective cosine corrector 220 to the optical output section 222, thus the light collection range S of the light collector 250 may be equal to the area of the reflector 210. In other embodiments, if the reflector 210 also reflects light not from the reflective cosine corrector 220, the light collection range of the light collector 250 may be smaller than the area of the reflector 210 such that the light collector 250 only receives the scattered light L' reflected by the reflective cosine corrector 220.

In the present embodiment, the scattered light L' from the reflective cosine corrector 220 is reflected back and forth between the reflector 210 and the reflective cosine corrector 220 by the reflector 210 until the scattered light L' enters the optical output section 222, thus increasing the ratio of the scattered light L' that enters the optical output section 222. In addition, since the light collection range S of the light collector 250 is the same as the area of the reflector 210, the incident light L will not enter the optical output section 222 directly; rather, the incident light L will be incident on the reflective scattering section 224 first. Therefore, substantially the same reflectance as that of the incident light L incident on the reflective cosine corrector 220 at different angles may be obtained. As a result, the optical head may receive substantially the same amount of light for incident light incident at different angles. In addition, comparing to the transmissive cosine corrector 120 used in FIG. 1, a higher conversion rate may be achieved as the reflective cosine corrector 220 converts the incident light L to the scattered light L'.

Figure 5:
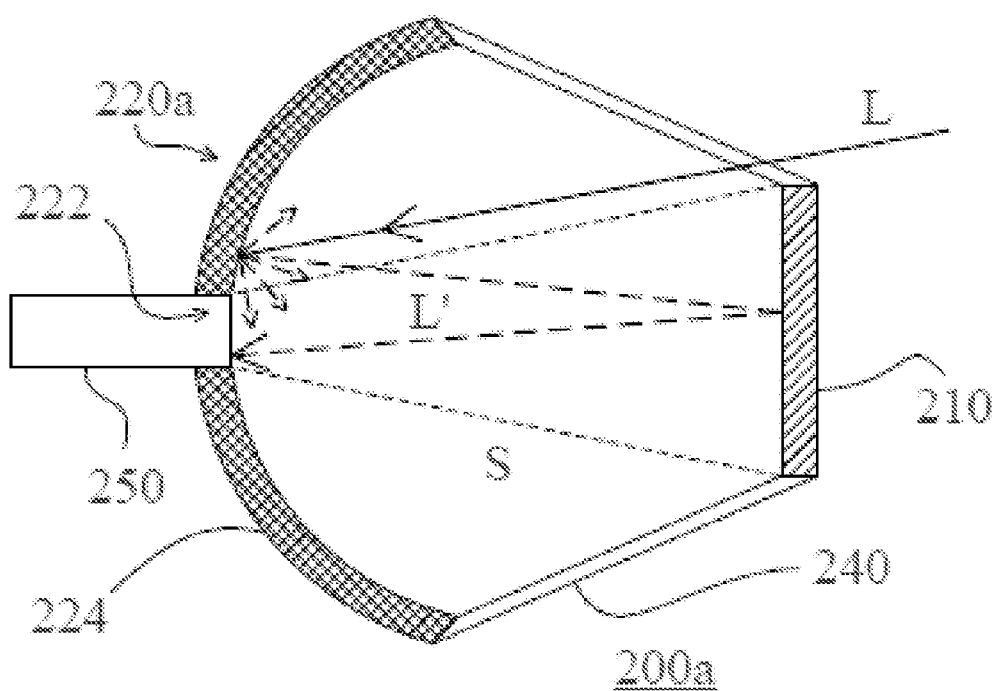
FIG. 5 is a side view of an optical head having a concave-shaped reflective cosine corrector.

The reflective cosine corrector in the present embodiment may have a flat or a concave surface. FIG. 5 is a side view of an optical head in accordance with another embodiment of the present invention. The embodiment shown in FIG. 5 is similar to that shown in FIG. 4 in most aspects. Thus, parts that are the same as or similar to those in FIG. 4 are given the same reference numerals. The difference between the two embodiments in FIGS. 4 and 5 is that the reflective cosine corrector 220a in FIG. 5 has a concave surface.

Figure 6:
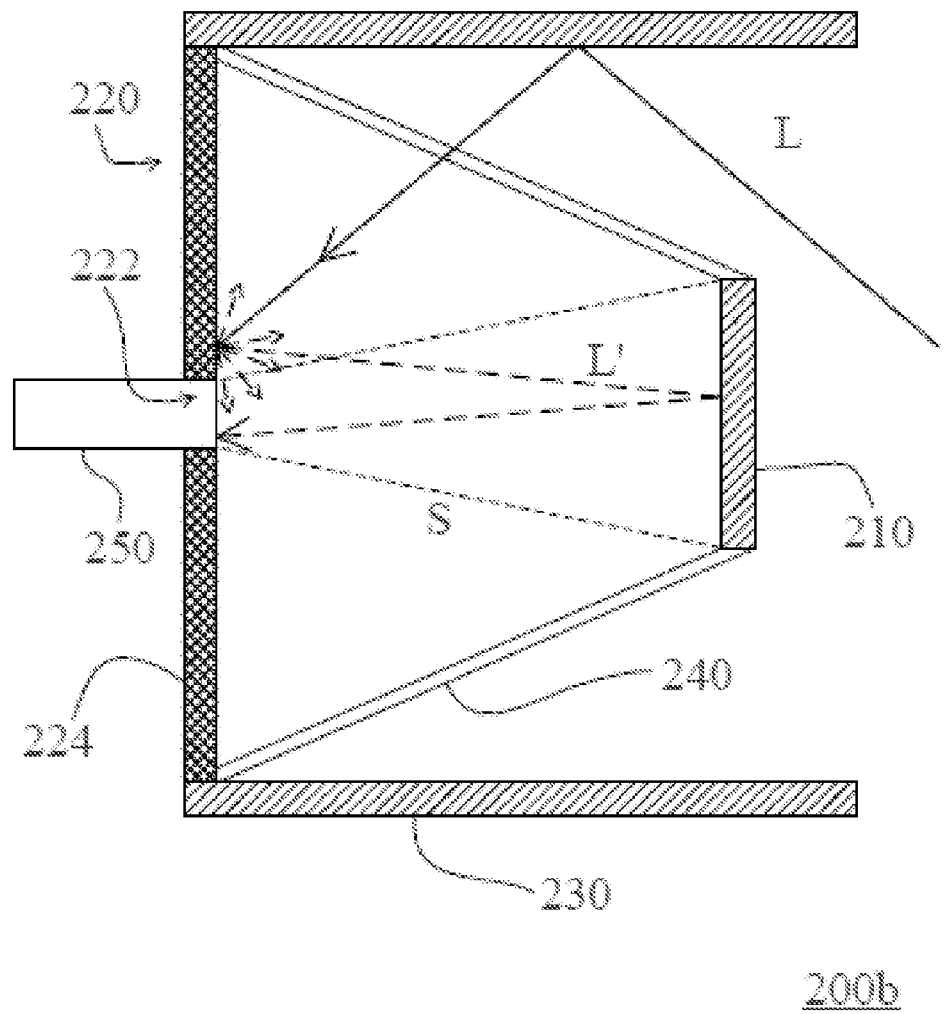
FIG. 6 is a side view of the optical head of FIG. 4 having a tubular reflective wall.

The optical head in FIGS. 4 and 5 may include a tubular reflective wall to further improve the ratio of the incident light incident on the reflective cosine corrector. Although the optical head illustrated in FIG. 4 is used as an example in the following description, this feature may also be employed in the embodiment of FIG. 5 or other similar embodiments. FIG. 6 is a side view of an optical head in accordance with another embodiment of the present invention. The embodiment shown in FIG. 6 is similar to that shown in FIG. 4 in most aspects. Thus, parts that are the same as or similar to those in FIG. 4 are given the same reference numerals. The difference between the two embodiments in FIGS. 4 and 6 is that the optical head 200b in FIG. 6 includes a tubular reflective wall 230. The tubular reflective wall 230 surrounds the reflector 210 and the reflective cosine corrector 220 to form an optical channel T for transmitting the incident light L. The incident light L is confined within the optical channel T before striking on reflective cosine corrector 220, thus the incident light L that travels in a direction not toward the reflective cosine corrector 220 may be recycled. As a result, the ratio of the incident light incident on the reflective cosine corrector 220 may be improved.

In addition, in the embodiments described above, the optical output section 222 of the optical head is located at the center of the reflective cosine corrector 220. However, the optical output section 222 may be located at other portions of the reflective cosine corrector 220, e.g., at periphery of the reflective cosine corrector, as long as part of the scattered light L' from the reflector 210 can enter the optical output section 222. Those skilled in the art may change the location of the optical output section according to actual implementation needs.

Furthermore, a convex mirror, a plane mirror, a concave mirror, a flat surface or a concave surface with diffusion structures may be used as the reflector 210 based on specific requirements. Using a convex mirror makes it easier for the scattered light L' from periphery of the reflective scattering section 224 to be reflected to the optical output section 222. The diffusion structures would allow the scattered light L' reflected by the reflector 210 to have a larger divergence angle. A proper combination of these features and components would improve the ratio of the scattered light that enters the optical output section 222.

Figure 7:
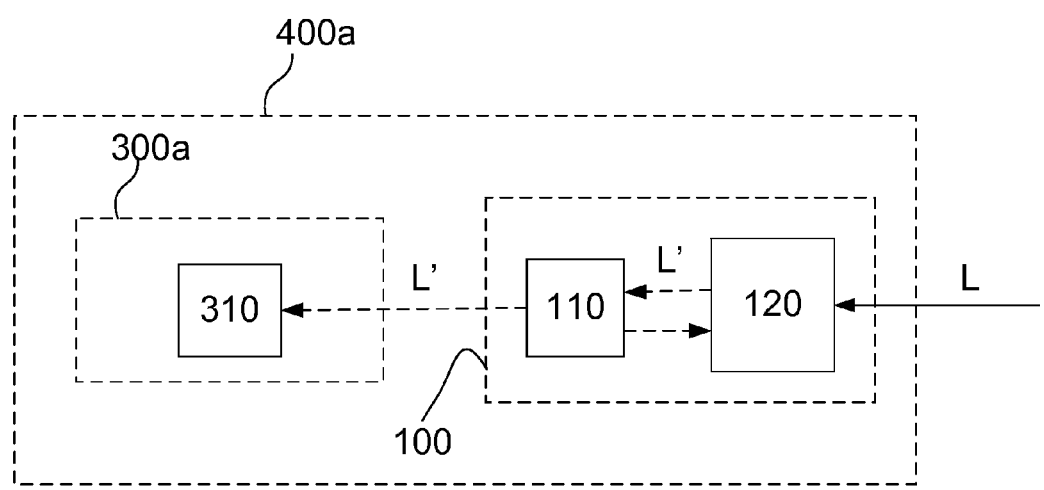
FIG. 7 is a functional block diagram of an optical system containing the optical head of FIG. 1 adopted for use in a Lux meter.

The optical head described above together with a light detector form a complete optical system. FIG. 7 is a functional block diagram of an optical system 400a using the optical head 100 of FIG. 1. In the embodiment shown in FIG. 7, parts that are the same as or similar to those in FIG. 1 are given the same reference numerals. The optical system 400a of the present embodiment includes an optical head 100 and a light detector 300a. The light detector 300a receives the scattered light L' as optical signals after the scattered light L' passes through the optical output section 112 of the reflector 110, and then converts the optical signals to an electrical signal for subsequent analysis and processing.

Figure 8:
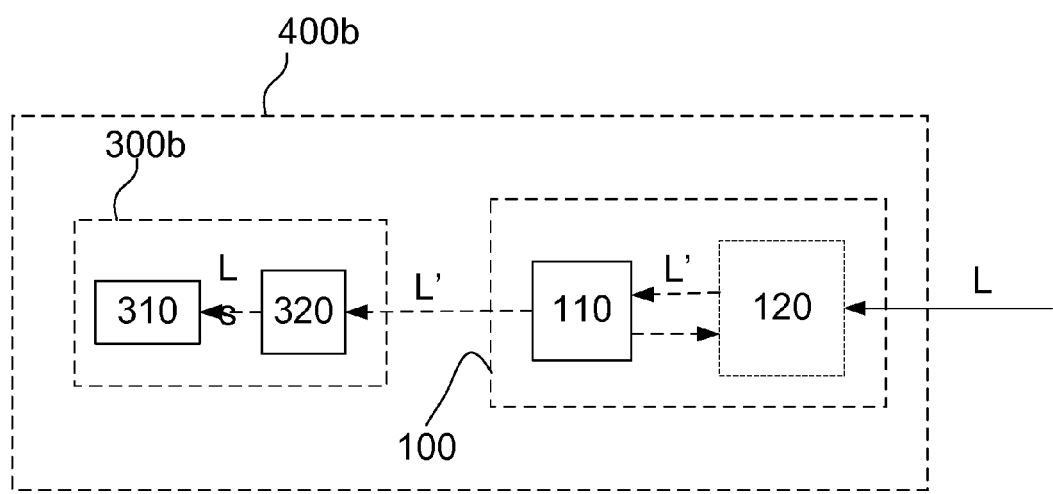
FIG. 8 is a functional block diagram of an optical system containing the optical head of FIG. 1 adopted for use in a spectrometer.

The light detector 300a of the optical system 400a may include a photo sensor 310 configured to receive the scattered light L' from the optical output section 112 as optical signals and convert the optical signals to an electrical signal. FIG. 8 is a functional block diagram of an optical system 400b containing the optical head 100 of FIG. 1 adapted for use in a spectrometer. Referring to FIG. 8, for spectrometer application, the light detector 300b of the optical system 400b may include a diffractive component (e.g., a grating) 320, through which the scattered light L' is diffracted into a diffracted light Ls. The photo sensor 310 receives the diffracted light Ls and converts it to an electrical signal for subsequent analysis and processing.

It should be noted that, as used herein, "diffracted light" means a light beam is made up of components of different wavelengths having different optical paths, and frequency ranges of these components may fall within the visible band, ultraviolet band or infrared band.

Figure 9:
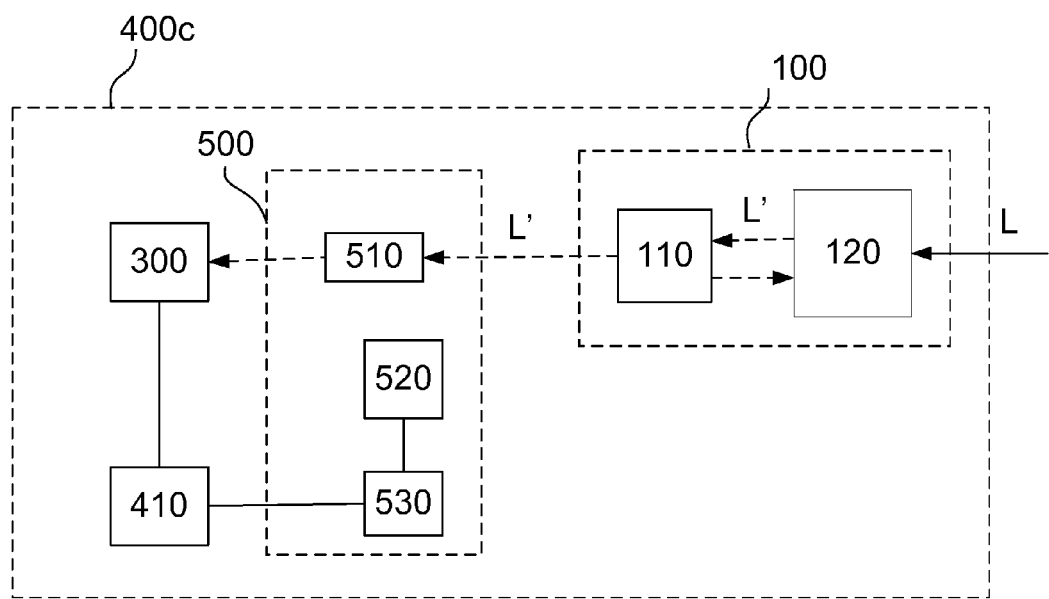
FIG. 9 is a functional block diagram of an optical system containing the optical head of FIG. 1 equipped with a shutter device.

The optical system described above may also include a shutter device disposed between the optical output section and the light detector. FIG. 9 is a functional block diagram of an optical system 400c of one embodiment of the present invention containing a shutter device. Referring to FIG. 9, the optical system 400c of the present embodiment includes a shutter device 500 for controlling whether the scattered light L' from the optical output section 112 can be received by the light detector 300. The shutter device 500 may include a shutter unit 510, an actuator unit 520, and a control unit 530. In the present embodiment, the shutter unit 510 is disposed between the optical output section 112 of the reflector 110 and the light detector 300. The control unit 530 controls the actuator unit 520 to drive the shutter unit 510, which is disposed between the optical output section 112 and the light detector 300. The control unit 530 controls opening or closing of the shutter unit 510 via the actuator unit 520 to determine whether the scattered light L' from the optical output section 112 can be received by the light detector 300. For example, the actuator unit 520 may be a coil, while the shutter unit 510 may be a shutter curtain. The control unit 530 applies positive or negative current to the actuator unit 520 to open or close the shutter unit 510. The optical system 400c may further include a processing unit 410 connected to the light detector 300 and the shutter device 500.

The shutter device 500 may be used to calibrate the light detector 300. For example, the processing unit 410 may close the shutter unit 510 first via the control unit 530, and then the light detector 300 reads an electrical signal (e.g., via an analog-digital converter). This electrical signal is a dark noise signal, which may be used to calibrate the processing unit 410 to get more accurate results in the subsequent measurements.

In other embodiments, the shutter unit 510 may be a liquid crystal panel. The actuator unit 520 may regulate the passage of the scattered light L' by controlling the alignment of the liquid crystal in the shutter unit 510.

In other embodiments, the control unit 530 may be placed outside the shutter device 500. For example, the control unit 530 may be integrated with the processing unit 410.

In the optical systems described above, a waveguide may be employed to couple individual unit in the light detector, or couple the optical head to the light detector so as to reduce losses caused by light escaping. In addition, in embodiments where the reflector of the optical head includes numerous optical output sections, the optical system may include numerous light detectors. Each of the optical output sections may be connected to a respective one of the light detectors directly or via a waveguide.

It should be noted that although the optical head of FIG. 1 is used in the optical systems illustrated in FIGS. 7, 8, and 9, other optical heads described in the above embodiments may be used together with a light detector to form an optical system. For example, an optical system may contain the optical head of FIG. 4. In addition, those skilled in the art may also apply features described in FIGS. 7, 8, and 9 to optical systems containing other optical heads. Reference may be made to that illustrated in FIG. 7, 8, or 9 and the corresponding description for implementation, and thus will not be repeated herein.

In summary, compared to conventional techniques, the present invention offers the following advantages:

1. A reflector is employed to reflect scattered light from the cosine corrector. As a result, part of the scattered light that has not yet entered the optical output section may be recycled by the reflector and re-enter the optical output section so as to improve the ratio of the scattered light that enters the optical output section, thus enhancing the sensitivity of the entire optical system.

2. The cosine corrector possesses Lambertian scattering characteristics, thus the incident light and the scattered light from the reflector may be evenly scattered. As a result, the amount of the incident light is less susceptible to the influence of the incident angles.

It should be noted that, all the characteristics and embodiments described above are for purpose of illustration, and may be modified and combined to obtain different embodiments without departing from the spirit of the present invention. Accordingly, the scope of the invention is not limited to the above embodiments and drawings, but is subject to the scope of the following claims.

What is claimed is:

1. An optical head for receiving an incident light, comprising:
a transmissive diffuser disposed in an optical path of the incident light and having a light-incident surface and a light-exit surface opposite to the light-incident surface, wherein a scattered light is emitted from the light-exit surface after the incident light is incident on the light-incident surface; and
a reflector having at least one optical output section and a reflective section, wherein the reflector is positioned to face the light-exit surface such that the transmissive diffuser shields the reflector from the incident light, wherein a first part of the scattered light from the light-exit surface enters the at least one optical output section without reflection and refraction, and a second part of the scattered light from the light-exit surface not entering the at least one optical output section is incident on the reflective section and reflected to the light-exit surface, other portions of the reflective section, or both the light-exit surface and the other portions of the reflective section without refraction.

2. The optical head of claim 1, wherein the reflector comprises a plurality of optical output sections.

3. The optical head of claim 1, wherein the transmissive diffuser is a transmissive cosine corrector, and the scattered light is in a Lambertian pattern, such that light rays of the incident light incident on the transmissive cosine corrector at different angles have a same transmittance.

4. The optical head of claim 1, wherein the width of the transmissive diffuser is longer than or equal to the width of the at least one optical output section.

5. The optical head of claim 1, wherein the reflector comprises a convex mirror, a plane mirror having retroreflective structures, a concave mirror having retroreflective structures, a plane mirror having diffusion structures, or a concave mirror having diffusion structures.

6. The optical head of claim 1, further comprising one or more reflective members connected to the transmissive diffuser, wherein the one or more reflective members is configured to face the reflector and to be coplanar with the transmissive diffuser.

7. The optical head of claim 2, wherein the optical output sections are disposed symmetrically with respect to a central axis of the reflector.

8. The optical head of claim 2, wherein areas of the optical output sections are the same.

9. An optical system for measuring an incident light, comprising:
an optical head, comprising:
a transmissive diffuser disposed in an optical path of the incident light and having a light-incident surface and a light-exit surface opposite to the light-incident surface, wherein a scattered light in a Lambertian pattern is emitted from the light-exit surface after the incident light is incident on the light-incident surface; and a reflector having at least one optical output section and a reflective section, wherein the reflector is positioned to face the light-exit surface such that the transmissive diffuser shields the reflector from the incident light, wherein a first part of the scattered light from the light-exit surface enters the at least one optical output section without reflection and refraction, and a second part of the scattered light from the light-exit surface not entering the at least one optical output section is incident on the reflective section and reflected to the light-exit surface, other portions of the reflective section, or both the light-exit surface and the other portions of the reflective section without refraction; and at least one light detector configured to convert the scattered light from the at least one optical output section to an electrical signal.

10. The optical system of claim 9, wherein the reflector comprises a plurality of optical output sections.

11. The optical system of claim 9, wherein the transmissive diffuser is a transmissive cosine corrector, and the scattered light is in a Lambertian pattern, such that light rays of the incident light incident on the transmissive cosine corrector at different angles have a same transmittance.

12. The optical system of claim 9, wherein the width of the transmissive diffuser is longer than or equal to the width of the at least one optical output section.

13. The optical system of claim 9, wherein the light detector comprises a photo sensor to convert the scattered light from the optical head to an electrical signal.

14. The optical system of claim 9, wherein the light detector comprises:

a diffractive component configured to diffract the scattered light from the optical head into a diffracted light; and a photo sensor configured to convert the diffracted light from the diffractive component to an electrical signal.

15. The optical system of claim 9, further comprising a shutter device, the shutter device comprising:

a shutter unit disposed between the optical output section and the at least one light detector; and an actuator unit configured to control opening or closing of the shutter unit so as to pass or block the scattered light.

16. The optical system of claim 9, further comprising a waveguide that connects the light detector to the optical output section of the optical head.

17. The optical system of claim 9, wherein the reflector of the optical head comprises a convex mirror, a plane mirror having retroreflective structures, a concave mirror having retroreflective structures, a plane mirror having diffusion structures, or a concave mirror having diffusion structures.

18. The optical system of claim 9, further comprising one or more reflective members connected to the transmissive diffuser, wherein the one or more reflective members are configured to be coplanar with the transmissive diffuser.

19. The optical system of claim 10, wherein the optical output sections are disposed symmetrically with respect to a central axis of the reflector.

20. The optical system of claim 10, wherein each of the optical output sections is connected to a respective one of light detectors of the at least one light detector.

21. The optical system of claim 20, wherein each of the optical output sections is connected to a respective one of the respective light detector through a waveguide.

* * * * *